(12) United States Patent
Kokemohr

(10) Patent No.: US 8,625,921 B1
(45) Date of Patent: Jan. 7, 2014

(54) METHOD FOR IMAGE PROCESSING USING LOCAL STATISTICS CONVOLUTION

(75) Inventor: Nils Kokemohr, Hamburg (DE)

(73) Assignee: Google Inc., Mountain View, CA (US)

( * ) Notice: Subject to any disclaimer, the term of this patent is extended or adjusted under 35 U.S.C. 154(b) by 853 days.

(21) Appl. No.: 12/566,782

(22) Filed: Sep. 25, 2009

Related U.S. Application Data

(60) Provisional application No. 61/100,604, filed on Sep. 26, 2008.

(51) Int. Cl.
*G06K 9/40* (2006.01)

(52) U.S. Cl.
USPC ............................................... 382/260

(58) Field of Classification Search
USPC .................. 345/606, 475, 538; 348/538, 672, 348/E13.065, E7.012; 358/522, 525; 382/168, 169, 170, 171, 172, 205, 260, 382/279, 300; 386/271; 700/189, 252; 702/180; 704/265; 708/5, 290, 313, 708/315, 420, 813, 847
See application file for complete search history.

(56) References Cited

U.S. PATENT DOCUMENTS

| | | | |
|---|---|---|---|
| 2007/0236517 A1* | 10/2007 | Kimpe | 345/690 |
| 2008/0091757 A1* | 4/2008 | Ingrassia et al. | 708/490 |
| 2008/0298680 A1* | 12/2008 | Miller et al. | 382/168 |
| 2010/0195905 A1* | 8/2010 | Richter | 382/167 |

OTHER PUBLICATIONS

Chen, Jiawen, et al, "Real-time Edge-Aware Image Processing with the Bilateral Grid", Computer Science and Artificial Intelligence Laboratory, Massachusetts Institute of Technology, Jul. 2007.*

* cited by examiner

*Primary Examiner* — Gregory F Cunningham
(74) *Attorney, Agent, or Firm* — IP Spring

(57) ABSTRACT

A method for filtering a digital image, comprising segmenting the digital image into a plurality of tiles; computing tile histograms corresponding to each of the plurality of tiles; deriving a plurality of tile transfer functions from the tile histograms preferably using 1D convolutions; interpolating a tile transfer function from the plurality of tile transfer functions; and filtering the digital image with the interpolated tile transfer function. Many filters otherwise difficult to conceive or to implement are possible with this method, including an edge-preserving smoothing filter, HDR tone mapping, edge invariant gradient or entropy detection, image upsampling, and mapping coarse data to fine data.

17 Claims, 3 Drawing Sheets

METHOD FOR IMAGE PROCESSING USING LOCAL STATISTICS CONVOLUTION

CROSS REFERENCE TO RELATED APPLICATION

The present Application claims the benefit of U.S. Provisional Patent Application No. 61/100,604 titled "Method for Image Processing Using Local Statistics Convolution" filed Sep. 26, 2008, the content of which is incorporated by reference in this disclosure in its entirety.

BACKGROUND

This disclosure relates to digital image filtering, based on applying 1D convolution kernels to 1D local histogram data, and is thereby very different from the conventional idea of applying 2D convolution kernels to 2D image data.

One major application of this image filtering domain is to enhance local contrast in an image. One conventional approach of doing this is to spread the values of the image signal so that the lowest appearing value is forced to 0.0 and the highest appearing value is forced to 1.0. If this is done for the entire image, this is an old, well-established approach. This can also be done locally, that is tile-by-tile, which is also not a novel approach. Another approach tries to find a local upper bound and a local lower bound of the image signal, which can be understood as a locally dependent "lowest value" and a locally dependent "highest value", so that the image signal is then spread so that the lower boundary is set to 0.0 and the upper boundary is set to 1.0. The downside is that this system creates artifacting and may take a long time to process.

There is a high demand in the field of image processing for edge preserving smoothing filters. An old, known filter of this kind is the median filter, as it leaves strong edges in the image without blurring them, while small details are erased. Another representative filter of the class of edge preserving smoothing is the bilateral filter, which is a derivation of the Gaussian blur filter. It has a wide usage for photographic and analytic image processing. Its downside is that a fast and efficient implementation is not easily possible.

SUMMARY

The invention surmounts these deficiencies in the prior art by providing a method for using 1D-convolution of histogram data to construct fast and efficient image filters. The histogram-convolution based image enhancements of the invention can be performed with minimal memory and processing requirements, and make extensive and fast use of a large range of filters.

Presented herein is a system that we name bilateral histogram equalization, which is a histogram equalization that spreads the image signal to span a range from 0.0 to 1.0 within the context of local objects in an image, that is for every pixel a lower boundary is established concerning only the peak of the local histogram that this pixel belongs to, and a higher boundary is established in similar fashion. Within the context of this disclosure, using 1D convolutions on 1D histogram data, this can be done without explicitly determining said boundaries; instead, an equation is provided in direct form that directly treats the signal so that each object in the image spans a contrast range of 0.0 to 1.0. This is not merely a formal difference, it also leads to different results, as pixel neighborhood issues dont play a role in this approach, and the computation is also faster.

An advantage of the system disclosed herein is that an edge-preserving smoothing filter can be implemented where, again, pixel neighborhood issues play no role and therefore many artifact problems are eliminated. The EPS filter introduced in this disclosure does again function on the idea of applying 1D convolution kernels to 1D histogram data. In its results it compares to a bilateral filter, while the processing herein takes place very fast, and full flexibility with respect to the convolution in signal domain is possible, unlike other fast embodiments.

This disclosure also describes a large amount of other filters using the said philosophy of 1D convolution kernels on 1D statistical image data in order to create a Tile Transfer Function, also called a Region Transfer Function, that can be used to enhance an image. Many of these filters would be difficult to conceive or to implement without the system disclosed herein. For instance, an edge-preserving smoothing filter is easily implemented with this concept. Other applications include HDR tone mapping, edge invariant gradient or entropy detection, image upsampling, mapping coarse data to fine data, and more. Since mostly 1D kernels are computed on histogram data, only little processing power is required, so that all filters in this disclosure run in linear time.

A method is disclosed for filtering a digital image comprising a first plurality of pixels, comprising segmenting the first plurality of pixels into a first plurality of regions; computing a first plurality of regional histograms by calculating a regional histogram corresponding to each region in the first plurality of regions; computing a first plurality of regional transfer functions by calculating for each region in the first plurality of regions a regional transfer function comprising a convolution of the corresponding regional histogram with a first convolution kernel; deriving an image transfer function by interpolation of two or more of the first plurality of regional transfer functions; and filtering the digital image by applying the image transfer function to each of the first plurality of pixels. The first plurality of pixels may comprise the entire digital image. Optionally, the regions may be chosen so that they do not overlap, and each pixel is contained within a single region.

In one embodiment, interpolation comprises selecting a pixel having a luminosity value from a first region of the first plurality of regions; computing a plurality of single value results by inputting the selected pixel's luminosity value into each of a second plurality of regional transfer functions, said second plurality including regional transfer functions corresponding to regions not comprising the selected pixel; and interpolating a resulting value for the selected pixel as a function of the plurality of single value results.

The first convolution kernel could be a Gaussian function. Preferably, the first convolution kernel is one-dimensional.

The regional transfer function may also be a function of a second convolution comprising the convolution of the corresponding regional histogram with a second convolution kernel. Optionally, the first convolution kernel is a Gaussian function, and the second convolution kernel is a product of a Gaussian function and a step function. The second convolution may optionally be weighted by pixel luminosity.

The regional histograms may be function of luminosity, or of other characteristics such as pixel difference, color, depth along a z-axis, or of saturation.

Another embodiment for filtering a digital image comprising a first plurality of pixels is provided, each pixel having a luminosity value and being within a neighborhood comprising a second plurality of pixels, the neighborhood having an extent, comprising selecting a pixel from the first plurality of pixels; calculating a new luminosity value for the selected pixel as a function of the ratio of the number of pixels in the neighborhood that fulfill a given condition to the total number of pixels in the neighborhood, the condition comprising a luminance comparison against said pixel; and repeating the calculating step until the luminosity values of each of the first plurality of pixels has been calculated. The first plurality of pixels could comprise the entire digital image. In one embodiment, the extent of the neighborhood is defined by a distance function, such as a spatial distance, a vector difference, or a colormetrical distance. The pixel numbers in the ratio may be weighted, such that pixels with a low distance to the selected pixel receiving a high weight and pixels with a high distance to the selected pixel receiving a low weight.

A program storage device readable by a machine, tangibly embodying a program of instructions executable by the machine to perform method steps to transform a digital image comprising a first plurality of pixels is also provided.

DETAILED DESCRIPTION

1 Introduction

The general idea in this disclosure is based on separating the image into tiles, also called regions. These tiles can have dimensions of 5×5 pixels up to ⅓rd of the image dimensions, depending on the application. For each of these tiles (or regions) a so-called tile transfer function, or region transfer function, is found so that if an image has 100 tiles, we will compute 100 local transfer functions. These functions are then used to map, for instance, input luminosities to output luminosities. To avoid a tiling effect (that is, visible edges along the margins of the tiles), the tile transfer functions need to be interpolated when they are applied to the final image.

Figure 1:
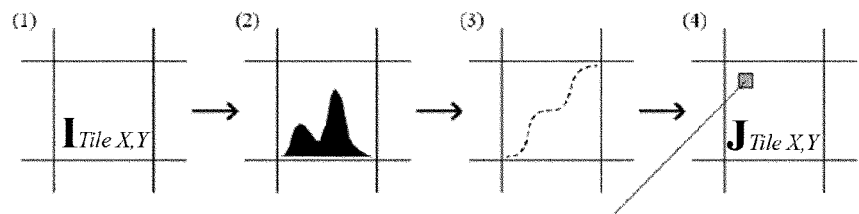
FIG. 1 is a representation of one embodiment of the methods of the invention.

FIG. 1 illustrates this concept. In (1), The image I is separated into tiles $I_{1,1} \ldots I_{X,Y} \ldots I_{MaxX,MaxY}$. In (2), for each tile a histogram is computed. Then, in (3), for each histogram a tile transfer function $f(x)$ is derived from the histogram. In (4), an interpolation takes place between the tile transfer functions and the resulting pixels are computed. For example, $J_{x,y}=\text{Interpolation}(f_{X-1,Y-1}.f_{X+1,Y+1})(I_{x,y})$.

Between step (2) and step (3), convolution kernels are applied to the histograms in order to obtain the tile transfer functions. While in conventional image editing, 2D convolution kernels are applied to 2D image data, here 1D convolution kernels are applied to 1D histogram data. This introduces new possibilities for image filtering, while the same time much less processing power is required, since the convolution is performed on a much smaller data set. In most cases, the calculation of the tile transfer functions requires less operations than the image has pixels, so the most processing intense steps are the calculation of the histograms (2) and the application of the tile transfer functions (4), which are both linear. Some of the filters introduced in this disclosure are an Edge Preserving Smoothing filter, a Bilateral Histogram Equalization filter, useful as a HDR tone mapper, an Edge-Ignoring Entropy Detector, a filter to map coarse data onto fine data, and a filter to measure soft image gradients, invariant to strong edges.

The concept introduced herein is referred to as the LSC filter domain. LSC stands for "Local Statistics Convolution"; this term was chosen because the convolution of histogram data is an important concept for all of the described filters.

1.1 Terminology & Conventions

The following conventions are used herein:

I is the original image.

$\dot{I}$ and $\ddot{I}$ are processing results of applying a filter to I.

J is typically the resulting image.

(x, y) denote a pixel coordinate, $I_{x,y}$ and $J_{x,y}$ denote pixels within I and J.

a will denote the edge length of an image tile, the tile size being a×a.

(X, Y) denote the coordinate of an image tile.

i denotes a pixel intensity.

$h_{X,Y}()$ denotes a histogram of the tile at (X, Y). Sometimes we will omit the indices, so that a tile histogram is noted as h( ).

$f_{X,Y}()$ will denote a tile transfer function.

$\tilde{f}_{x,y}()$ is an interpolated tile transfer function for the pixel (x, y).

Id stands for the identity function Id(t)=t.

∘ stands for the convolution operator.

gauss stands for a Gaussian kernel, often being 1D in this disclosure.

blur stands for a blurring kernel, for instance a Gaussian or box filter.

∇ is the gradient operator, being δI/δx×δI/δy.

2 LSC Filtering

The histogram of an image $$h_i = \sum_{x,y} \delta(I_{x,y} = i); \qquad (1)$$

contains cumulated data of all image features, that is, $h_i$ provides the amount of pixels of the intensity i. Note that δ( ) is an operator evaluating to 1 if its expression is true, and zero otherwise. However, finding such a histogram h is often worthless, as one will find all features of an image, being often hundreds of objects and shades, combined in one histogram.

Figure 2:
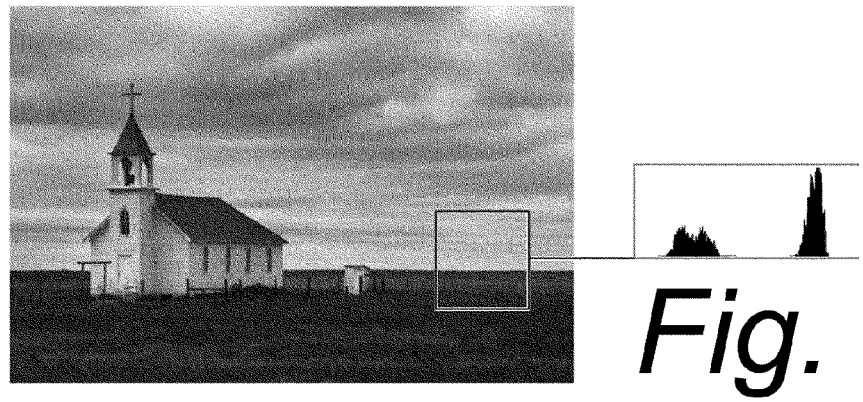
FIG. 2 is a representation of a digital image in which a histogram has been found for a portion of the image.

However, when finding the histogram of a small portion in an image, let's say $$I_{aX \ldots aX+a-1, aY \ldots aY+a-1}$$

it is much more likely that the tile histogram will provide more insights, as the smaller histogram is more likely to contain only one, two, three or four objects. So the assumption can be made that tile histograms in an image have fewer and more clearly defined peaks. A tile histogram is shown in FIG. 2.

Let us now divide the image I into a set of sub-histograms $h_{1,1}, h_{1,2}, h_{1,3} h_{max_x,max_y}$ so that $h_{X,Y,i}$ provides the amount of pixels with the luminosity i in the tile X, Y within the image. We now have divided the image into tiles and calculated histograms for each of the tiles. As these histograms are local, they contain only few statistical values of a local neighborhood.

2.1 The LSC Filter—Image blurring

A basic LSC filter is applying a blur within the LSC filter domain, therefore it is a good introduction to LSC filtering. Let us define a function $f_{average}(h_{X,Y})$ that calculates the average of the histogram $h_{X,Y}$:

$$f_{average}(h_{X,Y}, i) = \frac{\sum_j jh(j)}{\sum_j h(j)} \quad (2)$$

Note in equation (2) that the cumulated values of $h_i$ (the expression under the fraction) is no different from $a^2$, a being the edge length of a local image tile.

As is easy to see, $f_{X,Y,i}$ is constant for i and varies only from tile to tile, providing an average for each tile contents. Let's replace every pixel in I with the respective value in $f_{X,Y}$:

$$J_x = f(\lceil x/a \rceil, \lceil y/a \rceil, I_{x,y}) \quad (3)$$

This will lead, obviously, to a mosaicking effect, resulting in an image with one uniform gray level for each tile of a size of a×a pixels. However, performing a bilinear, Gaussian, bicubic or cosine interpolation between the tiles will lead more or less to a blurry image with a large blurring radius of the magnitude of a.

2.2 EPS Filtering

Multiplying each histogram entry with its index (equal to multiplying the histogram with the identity function) and dividing it by the sum of the histogram entries leads to the average intensity. This constrains the focus to a bandwidth within the signal domain, resulting in an average value representative for a certain reference color i:

$$f_{EPS,X,Y}(i) = \frac{(h \cdot Id) \circ \text{gauss}}{h \circ \text{gauss}}(i) \quad (4)$$

Equation 4 above divides a blurred version of h·Id, that is, a histogram where its entries are multiplied with its index, by a blurred version of the histogram itself. Note that ogauss denotes a 1D-convolution with a Gaussian filter. Note that equation 4 is in its idea identical to equation 2, with the difference that the average calculated for every i is constrained within the signal domain.

Figure 3:
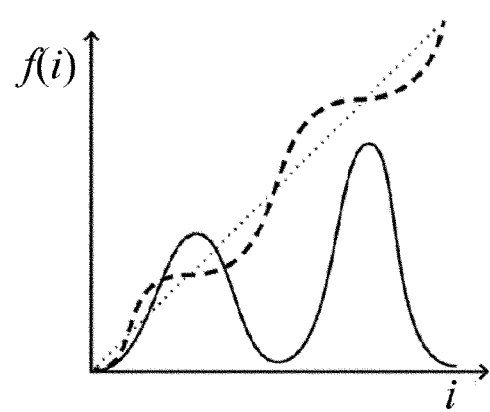
FIG. 3 is graph showing the relationship of the histogram to the edge preserving filter.

Applying equation 4 to every pixel in the image will result in a detail reduction per tile. We'll from here on call functions like $f_{EPS}$ a tile transfer function, or briefly TTF. This function, if applied to each pixel in the tile, will reduce details. As shown in FIG. 3, $f_{EPS}$ (dashed line) plateaus where h() (solid line) has peaks, and the center of these peaks coincides with the identity (dotted line). This basically means that image areas belonging to one peak are smoothed by the TTF, where the average of the original values is about identical to the average of the smoothened areas.

However, it goes without saying that this leads to strong tiling artifacts. Prior art solutions include calculating a local histogram for every pixel, while the present invention performs an interpolation between the tile transfer functions.

Given a pixel x, y, the tile edge length a, an image I, a set of tile transfer functions $f_{X,Y}(i)$, then an interpolation could for instance be:

$$\tilde{f}_{x,y} = \sum_{X,Y} f_{X,Y} \cdot \omega\left(\frac{\sqrt{\left(x - aX + \frac{a}{2}\right)^2 + \left(y - aY + \frac{a}{2}\right)^2}}{a}\right) \quad (5)$$

with $$\omega(d) = \frac{1}{\sigma\sqrt{2\pi}} \exp\left(-\frac{1}{2}\left(\frac{d}{\sigma}\right)^2\right)$$

Obviously, a Gaussian interpolation is provided above with sigma being the standard deviation, while the unit of the standard deviation in this case is not pixel size, but tile size. We found that from all possible interpolations performed between tile transfer functions:
  bilinear works fast and well, but not superb
  cosine can create artifacts in soft gradients
  bicubic works mediocre
  Gaussian (see equation 5) works optimal, even if interpolation takes place on as few as 5×5 or even 3×3 tiles.

We find that bicubic does not work optimally as said interpolation attempts to maintain optimal detail through the interpolation, which is not wanted here, since a smoothing effect is desired. Therefore we suggest Gaussian interpolation.

We denote $f_{X,Y}()$ as the TTF of a given tile (X,Y), while we will denote $\tilde{f}_{x,y}()$ as the already interpolated function that varies from pixel to pixel. Note that when Gaussian kernels are used for the histogram convolution as well as for the spatial interpolation, $\tilde{f}_{x,y}(i)$ will be smooth with respect to variations of x, y and i.

The process shown herein provides a fast way for EPS filtering at a speed of O(n), since the creation of the histograms $h_{X,Y}$ requires a single pixel-read operation for each pixel in the image. Creation of the tile transfer function TTF, for instance as in equation 4, requires almost no processing time, as it is performed on 1D data, which is typically much less data than the image data. Finally, the values found in the TTF of 2×2, 3×3 or 5×5 adjacent tiles need to be interpolated, which consumes the most processing time, but still can be performed in linear time. (Even large softening radii can be simulated by increasing a as opposed to increasing σ.) Note that while equation 5 suggests for every pixel in the image the interpolation of the entire function, of course only a single element of the function needs to be interpolated.

Since large as well as small radii can typically be simulated with an interpolation between a constant number of tiles, the processing requirements are linear, that is, regardless of image size and convolution kernel a complexity magnitude of O(n) can be achieved where n is the amount of pixels in the image. LSC processing will only exceed these limits when a very high resolution of the histograms in the intensity domain is desired, so that the histogram entries exceed the number of pixels within a tile, but those appear to be rare corner cases.

2.3 Generalization of the LSC concept

In general, the idea of LSC filtering is now as follows:
  separate the image into tiles of dimensions a×a;
  calculate local statistics (e.g., a histogram) for each of said tiles;
  derive TTF from the local statistics of each tile, for instance by applying convolution filters to the histograms;
  interpolate between TTF of adjacent tiles; and
  apply the interpolated TTF to the image.

As introduced above, this allows, for example, for fast EPS filtering. However, the way the statistics are collected per tile (1D as shown, or 3D for color images) can be varied, and of course the creation of the TTF provides as well for many options. The following sections will introduce more applications of LSC filtering.

2.4 Rarity Operator

The LSC framework provides for a fast method to determine how "rare" a pixel's value is within its neighborhood. While determining the rarity of a single pixel color within an image is easy, determining the same value for all pixels within a certain neighborhood in efficient time and based on robust statistics isn't. With the following TTF:

$$f_{rarity}(X, Y, i) = \log \frac{1}{(h_{X,Y} \circ \text{blur})(i)} \quad (6)$$

where the term $(h_{X,Y} \circ \text{blur})(i)$ is to be understood as the i'th value of the function $h_{X,Y}$ convolved with a blurring kernel, will provide a value for how rare the given pixel's value is within a spatial range of a (see equation 5) while a tolerance within the signal domain is provided by the standard deviation of the kernel blur.

2.5 Non-Edge Sensitive High Pass Filter

Figure 4:
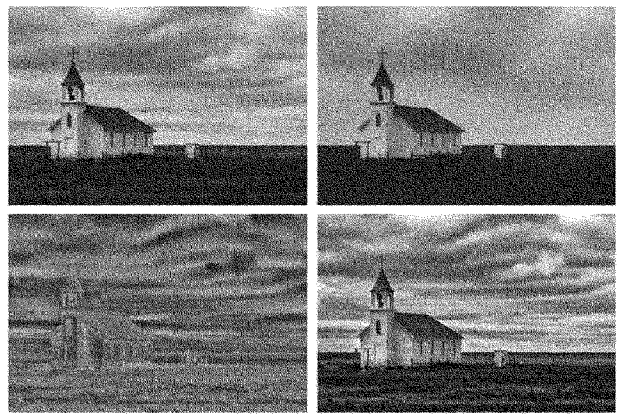
FIG. 4 is a set of representations of digital images showing the result of applying different filters.

The following TTF:

$$f_{highpass, X, Y} = Id - \frac{(h \cdot Id) \circ \text{gauss}}{h \circ \text{gauss}} \quad (7)$$

provides a filter for extracting the high pass out of an image while strong edges are ignored. Typically, this will extract the structure of an image (fine branches in a tree, fur of an animal, fine cloud structures) while not providing extreme values for strong edges (like the transition from a building to the sky). Similarly, the tile transfer function $$f_{icrease\ structure, X, Y} = Id + \gamma \left( Id - \frac{(h \cdot Id) \circ \text{gauss}}{h \circ \text{gauss}} \right) \quad (8)$$

will emphasize the image's structure by the factor provided in $\gamma$. FIG. 4 shows a digital image (top left) filtered with an EPS (top right), the result of equation 7 (bottom left) and the result of equation 8 with $\gamma=0.8$ (bottom right).

2.6 Entropy Filter

Determining the entropy of an image is easy, and many local entropy operators have been suggested. However, to our knowledge, no entropy filters are known that are edge-preserving. That is, most entropy filters analyze an image area of n×n pixels around a given pixel x, y, determine the entropy of that area, and assign said entropy to the coordinate x, y. This will lead to the effect that a small patch of blue sky that's surrounded by branches of a tree will have a high entropy, while a remote area of the same sky will have a low entropy. Sometimes, this will be the desired behavior, sometimes it would be desired that all pixels of the sky lead to about the same entropy. The following tile transfer function can be used:

$$\theta_{entropy, X, Y}(h_{X,Y}, i) = \sigma_i \quad (9)$$

with $\sigma_i$ being the standard deviation of:

$$g(j) = h(j) * \exp\left(-1/2 \frac{(j-i)^2}{\psi}\right)$$

where $\psi$ is the standard deviation of the superimposed filter, so that generally $\sigma_i \leq \psi$. This means that $\psi$ defines the 'window' in which an entropy can be detected, that is:

- no variances in a structure (plain sky) will lead to a low entropy
- variations in a structure within the magnitude of $\psi$ will lead to a higher entropy
- variations in a structure greater than the magnitude of $\psi$ (such the black letters on white paper) will not affect the entropy.

2.6.1 Alternative Entropy Finding

An alternative approach to finding an entropy is as follows:

$$h(i) = \sum \delta(I_{x,y} = i) \quad (10)$$
$$k(i) = \sum u(|I_{x,y} - I_{x+1,y}|) * \delta(I_{x,y} = i)$$
$$f_{entropy2} = \frac{k \circ \text{blur}}{h \circ \text{blur}}$$

In equation 10, sums of pixel neighbor differences are divided by the amount of pixels of that color, where both again are convolved with a 1D blurring filter. The function u( ) can be used to dampen pixel differences that are likely to be hard edges in the image and unlikely to be structure-related pixel differences, where u( ) can be a weighting function, such as $u(x)=$ or $u(x)=x$ in the trivial case.

2.6.2 Usages for Entropy

The Entropy can be used to modify an image. For instance, the image can be made more pleasing by lightening those areas that have a high entropy and darkening the others. Imagine a person being photographed against a sky, where the sky has a low entropy and the person has a high entropy—accentuating the person by increasing his/her brightness while darkening the background will make the image more pleasing.

Conventional entropy filters will not be able to perform this task, as they'd add a soft, large, defocused glow to the edges within the image (remember that conventional entropy filters detect a high entropy a few pixels to either side of dominant edges), so the technique of changing the illumination based on entropy will only work if the entropy is detected in an edge-preserving fashion (as suggested in here).

2.7 Local Histogram Equalization

The concept of histogram equalization is well known. The idea is to redistribute the color intensities in an image with the formula:

$$f(r) = \frac{\int_0^r h(i)\,di}{\int_0^1 h(i)\,di} \cdot 256 \quad (11)$$

If $f( )$ is being applied to all pixels in the image, each luminosity will appear with the same likelihood in the image. This is sometimes a wanted effect, sometimes this effect has disastrous side-effects to the image—particularly when one gray level is dominant (like a plain white surface), whose intensity values will then be distributed over a wide range of values, even if the image resolution (resp. dynamic range) doesn't provide a sufficient PSNR for this kind of operation.

The equation:

$$f(r) = \frac{\int_0^r u(h(i))\,di}{\int_0^1 u(h(i))\,di} \cdot 256 \qquad (12)$$

will not have these deficiencies. The limiting function u( ) is defined as earlier in this document, for instance, u( ) can be a square root. This will ensure that the equalization will affect mostly those areas with low values in the histogram; in other words: the function above will modify the histogram so that gaps between the histogram's peaks will be filled up, while peaks remain peaks of about the same shape, leading to more natural structures.

Now applying equation 12 tile-wise as shown in equation 2 (calculating tiles of histograms) and 5 (interpolating between transfer functions) will result to a locally adaptive histogram equalization. Note that we suggest for better effects a large tile size in the image, such as 10%-20% of the image dimensions.

2.8 Bilateral Histogram Equalization

The implementation as shown in equation 12 will have a haloing issue, which could be avoided by using very large tiles. (Halos of a magnitude of 33% to 50% of the image dimensions are not perceived as halos by the human eye). However, this limits the filter's ability to enhance images locally, particularly counter-light effects of a magnitude smaller than 33%-50% of the image size will not be corrected. So a smaller tile size is desired while not producing halos along strong edges.

It is preferable to introduce a bilateral dependency, noted as:

$$f(r) = \frac{\int_0^r \left(u(h)\exp\left(-1/2\frac{(i-r)^2}{\sigma}\right)\right)(i)\,di}{\int_0^1 \left(u(h)\exp\left(-1/2\frac{(i-r)^2}{\sigma}\right)\right)(i)\,di} \cdot 256 \qquad (13)$$

which is similar to:

$$f(r) = \frac{u(h) \circ \mathit{leftgauss}}{u(h) \circ \mathit{gauss}} \cdot 256 \qquad (14)$$

where the magnitude (σ) of the Gaussian bell curve used for convolution needs to be of a high magnitude, so for instance if images with values reaching from [0 . . . 255] are given, a σ of 50 . . . 150 may be adequate. The convolution kernel leftgauss is meant to be a Gaussian kernel where all values to the right of its center are forced to zero. This can be done by a product of the Gaussian function and a step function with zero for all positive values. Of course, in analogous fashion a rightgauss kernel could be constructed with a step function with zero for all negative values, and then inverted.

The idea of the above given equations is to detect for a given pixel's luminosity if it belongs to the lower, middle or higher part of its peak in the histogram. The Gauss functions are used to fade out remote, unwanted peaks, and then the integral of the area to the left of i is divided by the entire integral. That provides information how the input luminosity i relates to the luminosities of the entire peak.

This is to say that equations 13 and 14 are examples of functions that may be used to calculate a new luminosity value of a selected pixel as a function of the ratio of the number of pixels in the neighborhood that fulfill a given condition to the total number of pixels in the neighborhood. The condition in this case comprises a luminance comparison, in which the function selects for pixels that are brighter (or darker) than the selected pixel.

The neighborhood could be chosen as appropriate, and the extent of the neighborhood could be defined with a distance function. The distance function could comprise one or more of a spatial distance, a vector difference, or a colormetrical distance. The distance function could be used to weight the number of pixels, so that pixels with a low distance to the selected pixel receive a high weight and pixels with a high distance to the selected pixel receive a low weight. Note that in the LSC system, the convolution of the histogram data with a 1D kernel is one fast way to weight pixels based on the abovementioned distance with respect to luminance. All or part of the image could be processed by using these equations repeatedly.

Figure 5:
FIG. 5 is a set of three representations of a digital image (left), showing the comparison of a prior art highlights filter (middle) and a bilateral histogram equalization according to the invention (right).

This also is a very good HDR tone mapping operator, as its results look often natural and as the TTF automatically maps the input signal to a predefined range, regardless what the distribution of the input signals is. FIG. 5 shows a digital image (left) that has been filtered with a prior art highlights and shadows correction (center), and a bilateral histogram equalization according to the present invention (right).

A fundamental difference between this HDR tone mapper and the majority of prior art tone mappers is that conventional tone mappers try to relate a pixel to its surrounding average luminosity, namely the "adaption luminance." Said adaption luminance is a scalar value and carries no information about the local structure. This tone mapper puts each pixel not only into relation to an average luminance, but in relation to the entire surrounding peak, including its center and its broadness.

2.9 Artifact Free Depth-Map Image Blurring

Imagine an image with a candle in front of a patterned wall, the candle being at a distance of 5 cm from the camera, the wall being at 15 cm from the camera, and further imagine this image to be recorded with a 3D camera recording depth information. So, in addition to the colors red, green, and blue, there would be a depth map $D_{x,y}$ showing low values for the candle and high values for the wall, representing distances from the camera.

If now the task is to blur the background behind the candle, the most convenient way would be to blur the image and to replace all pixels with a depth value $D_{x,y}$=15 cm, with the blurred image. However, this will create a halo around the candle, since part of the blurry candle will be written into the background.

We believe this issue can be solved with the LSC approach. An option is to create for each image tile [X, Y] a histogram that doesn't map pixel count based on luminosity, but on depth. Subtotal, we will need the following histograms for each tile (we omit the tile indices X,Y):

$$h_R(d) = \sum_{x,y} I_{R,x,y} \delta(D_{x,y} = d) \qquad (15)$$

$h_G(\ )$ and $h_B(\ )$ can be calculated in a similar way.

$$C(d) = \sum_{x,y} \delta(D_{x,y} = d) \tag{16}$$

The three functions $h_R$, $h_G$ and $h_B$ hold now accumulated luminances, categorized by the depth value d, where the histogram C holds accumulated pixel counts per tile, categorized by the depth value d.

Now a blurred version of the image can be processed by the following TTF:

$$f_{depthblur,R,X,Y}(d) = \frac{(h_R \circ \text{gauss})(d) + \epsilon}{(C \circ \text{gauss})(d) + \epsilon}. \tag{17}$$

The function $f_{depthblur,R,X,Y}$ will now produce a blurred value for the red channel for the current tile X, Y for each depth d. The calculation of the green and blue channel is equivalent. For instance, if the current tile X, Y may contain a red candle at 5 cm distance from the camera, while containing a blue background at 15 cm from the camera, then $f_{depthblur,X,Y}(5)$ will deliver the average of the candle's red pixels, while $f_{depthblur,X,Y}(15)$ will deliver the average of the background.

Note that the spatial blurring radius will be determined by the underlying tile size a×a, while the Gaussian filter provided in equation 17 will determine how far pixels have to be away from one another along the 3rd dimension $D_{x,y}$ in order to not be convolved with one another. So if in our example the background should not be mixed with the candle, the Gaussian kernel gauss should extend over less than 10 cm. Note that in this example very small tile sizes can be used, for instance a=5 to achieve not-too-large blurring radii, in which case it will be likely that C0 is a very sparse histogram. For that case, $\epsilon$ in equation 17 avoids division by zero.

Applying the TTF $f_{depthblur}(\ )$ to the image as shown in equation 5 will lead to a blurred image where objects close to the camera will not 'smear' into objects far away from the camera during the blurring process. This image can then be blended with the original image based on the depth map $D_{x,y}$ where the above described artifacts should not occur.

Note that the size of the Gaussian kernel in equation 5 can be varied based upon the current pixel's depth $D_{x,y}$, while the Gaussian kernel in equation 17 may be varied, for instance to achieve that objects at 5 cm and 15 cm distance from the camera will not blend into one another, while objects at 105 cm and 115 cm distance from the camera actually do blend into one another.

2.9.1 More Observations to Depth-Maps

Let us examine some properties of the 1D convolutions. The Gaussian kernel does not drop to zero, that is the Gaussian bell curve is always >0. (Note that this is not the case with many pseudo-Gaussian filters which are often used for speed reasons). This characteristic of the Gaussian function means that sparse, positive datasets will also not contain any zeros after being convolved with a Gaussian function. Of course, this can only be observed when floating point numbers are used in the implementation.

This has some interesting implications. The first implication is that the tile size can be reduced dramatically. For instance, with a tile size of 4×4 pixels, the histogram won't have more than 16 entries, 256-16 or more will remain empty. However, even if such a sparse histogram is used, functions like $f_{EPs}$ or $f_{3DBlur}$ will be defined for the domain of [0 ... 255] and they will be smooth. Therefore the filters herein work as well with small tile sizes.

The second implication is that all tile transfer functions suggested in this disclosure can be evaluated for parameters not occurring in the image. So for instance, $f_{depthblur}$ can be evaluated for every location in the image and for every 3D depth D. This means that we have a volumetric information for every spatial position of the image suggesting a "most likely color." For instance, imagine again an image with a red candle in front of a blue wall, the candle at 5 cm distance and the wall at 15 cm distance, and imagine that the pixel coordinate (100,100) is in the middle of the candle. Then evaluating the function $f_{depthblur}(100, 100, 5\text{ cm})$ will, obviously, lead to a red value, while $f_{depthblur}(100, 100, 15\text{ cm})$ will provide a color that is assumed to be behind the candle, in this case most likely blue.

This allows us to determine for every location within the 3D space over the image a most likely color. This can be helpful to complete a 3D scenario that has been recorded incompletely due to the limited perspective of the camera.

Additionally, we can make an assumption on where likely surfaces are. (For instance in order to receive an assumption on the surface data of the wall behind the candle where it was not recorded by the camera). Let us define:

$$h_{pixelcount}(d) = \sum_{x,y} \delta(D_{x,y} = d). \tag{18}$$

Then we receive:

$$f_{depthdensity,X,Y}(d) = \frac{(h_{pixelcount} \cdot Id) \circ \text{gauss}}{h_{pixelcount} \circ \text{gauss}}(d). \tag{19}$$

Now while $h_{pixelcount}$ holds 1D statistics of pixel count versus depth per each tile, the function $f_{depthdensity,X,Y}$ has plateaus where $f_{pixelcount}$ has peaks, and it is smooth. Particularly $\tilde{f}_{depthdensity,x,y}$ (the interpolated version, see above) is smooth within spatial and depth domain.

Now the expression $$\tilde{f}''_{depthdensity,x,y} = 0 \text{ and } \tilde{f}'''_{depthdensity,x,y} > 0 \tag{20}$$

defines a manifold that will be a smooth surface within the 3D space that does not have holes and that will suggest a location of a surface within the 3D space even for those locations in the image that were not recorded, e.g., the wall behind the candle, or the backside of the candle. Note, though, that the precision of the routine is limited to a, a being the tile size.

Note that a different definition would be $(h_{pixelcount} \circ \text{gauss})'=0$ and $(h_{pixelcount} \circ \text{gauss})''<0$, which is longer to write down but a little easier to implement.

Now with equations 20 and 17, we will have information for likely-to-exist surfaces and for most-likely colors at the location of those surfaces. This will allow us to rotate the recorded 3D image by a few degrees and to inpaint the then missing regions.

2.10 Mapping Imprecise Information to High Resolution Data

It often occurs that a camera captures good luminosity data but additional data (chrominance, 3D depth, infrared temperature, etc.) with a lower spatial resolution. We call the former fine data and the latter rough data. For many purposes it might be desirable to upsample the rough data to the resolution of the fine data while reproducing the fine data edges in the upsampled channel.

Let $$I_{x,y}^{fine}$$

denote the fine image data and $$I_{x,y}^{rough}$$

the trivial upsampled rough channel. In the following we only consider coordinates x, y in the fine resolution. As in the above the image is divided into tiles. Let $$r(i) := \sum_{x,y} \delta(I_{x,y}^{fine} = i) \cdot I_{x,y}^{rough} \quad (21)$$

denote the function taking fine channel intensities to there corresponding cumulated rough channel intensities and $$f_{f2r}(i) := \frac{r \circ \text{gauss}}{h \circ \text{gauss}}(i) \quad (22)$$

denote a TTF taking fine data intensities to rough data intensities. As in the previous sections the tile indices are omitted for the sake of readability. $f_{f2r}$ might be understood as the average rough channel value belonging to a given fine channel value on a specific tile. Equation (22) is very similar to (4). The only difference is the we distribute averaged rough channel data instead of averaged fine channel data.

Using (22) as a TTF in (5) results in a new channel $J_{x,y}$ approximating the values of $I^{rough}$ and the edges of $I^{fine}$.

Applications can be many:

(1) Imagine a camera that captures mainly luminosity information (i.e., sensor elements with no color filter connected) and only sparse color information. Then the rough chrominance data can be mapped to the fine luminance data.

(2) Imagine a camera that records a natural image with a fine resolution and 3D depth data with a rough, poor resolution; then equation 21 can be used to map the poor 3D data to the fine color/luminance data.

(3) A camera recording other spectral information (infrared, UV) with lower precision than the visible light bands can use said algorithm to map the rough data to the fine data.

(4) Conversely, if a camera records precise information in a non-visible band, this band can be used to map the rough, visible data to the fine data.

"Roughness" does not necessarily need to mean lower resolution, it can also mean that the rough data have a greater expected signal error (noise) or spatial error (distortion), or all of the three.

2.11 Edge Invariant 3D Gradient Field

It is theoretically possible to find detect surface orientation within 3D space from looking at the gradients in a 2D image. However, nature is far too complex for these simple assumptions, so real 3D construction in real-word conditions is not really possible.

However, some simple image processes (such as pseudo-relighting) can be per-formed by using the image's luminosity gradient instead of the 3D gradient, that is $$g_{x,y} = \nabla I_{x,y} \quad (23)$$

However, imagine an image with a ball in front of a candle. Both the ball and the candle will have smooth gradients, but along the edge between ball and candle the gradient ∇I is quite extreme due to abrupt image changes. Typically, this is a gradient that is present in the image, but that we do not want to obtain. While things are simple in an image with a ball and a candle, one will receive large amounts of gradients that are undesired if images get more complex (trees, clouds, eye lashes, hair), that is most real world images.

So it would be beneficial to find an algorithm that spots soft/continuous gradients within the image while ignoring edges between objects.

Let's take an image I, being separated into tiles of dimensions a×a, while the tiles may be smaller here than in the preceding examples, such as 15×15 pixels. Now we can make the following assumptions:

In each tile, there are about one to three different image objects

Each image object has, within a tile, about one level of luminosity

If adjacent tiles have same clusters of gray levels, these belong to the same object If adjacent tiles have similar, but slightly different clusters of gray levels, this is an indication for a gradient.

Observing the TTF $f_{EPs}$ in equation 4, we find that $f_{EPs}(i)$ provides the average luminosity of the peak in the histogram that i belongs to. Therefore, $$f_{gradient}(X,Y,i) = \nabla f_{EPS}(X,Y,i)dXdY \quad (24)$$

provides a measure for the gradient for a given luminosity in a given image tile. Note that the gradient operator is being calculated in direction of X and Y, the smallest discretization is the tile size, so only gradients of the magnitude of a will be detected. (Of course, one could detect the gradient based on $\tilde{f}_{EPS}$ which is defined for each pixel, but that would provide no finer data, since the minimum wavelength occurring in all $\tilde{f}$ is a.) The same time, a gradient will be provided for every tile and for every luminosity i, even if a tile doesn't contain all possible luminosities. So in order to detect the gradient of a given pixel somewhere in the image, $f_{gradient}(\ )$ needs to be evaluated applying the LSC interpolation methods as shown in equations 5.

2.12 Upsampling Using LSC

Imagine a low resolution of an image with black letters in front of white paper. Common techniques to upsample an image (for instance to double the image's spatial resolution in X and Y direction) include adding additional pixels for every original pixel in the optimal case, typically even more. Typically, if interpolation takes place between dark and bright pixels, interpolated pixels will often be of a gray level between dark and bright. This will lead to many gray pixels along the edges of detail, so that the image will be perceived as being blurry after the up-sampling. Some enhancements to this have been suggested, but many of the enhanced upscaling routines are slow or their results include blurriness, halos, or both.

We note I as the input image, İ as a conventionally interpolated image (for instance bilinear), İ having more pixels than I, and Ï our desired result, that is an image of the same dimensions of İ but with less of a blurry-edges effect. If (x, y) is a coordinate in I, (x', y') is the corresponding coordinate in İ and Ï. (Note that in the realm of image upsampling, it is common to deal with fractional pixel coordinates.) Ï can then be computed as follows:

$$\ddot{I}_{x',y'} = f_{EPS(I)}(\dot{I}_{x',y'}) \qquad (25)$$

where $f_{EPS}$ needs to be derived from the original image I as in equation 4. This will ensure that only the original image's pixels with the coordinate's (x, y) will contribute to the TTF $f_{EPS}$, so that $f_{EPS}$ will plateau along the peaks of the original image's histogram. Therefore, if $f_{EPS}$ is applied to the newly interpolated pixels of İ, gray-level pixels will be transformed towards the peaks dominant in the original image.

Experiments have shown that in this scenario, a small tile size produces good results. Also, when tile sizes are around 5×5 pixels, an interpolation as proposed in Equation 5 is not even necessary, as the resulting tiling artifacts are barely visible. Note, though, that the convolution that needs to be performed for each tile as in equation 4 will consume some processing power. This can be accelerated by discretizing the histogram to about only 30 levels of gray, where domain of the histograms (and therefore of $f_{EPS}$) is limited to the pixels actually present in said tile. Often the histograms need surprisingly few levels of discretization.

3 Enhancements to LSC Filtering

This section deals with enhancements to the LSC filtering that apply to most of the filters introduced in section 2.

3.1 Color Dependent LSC Filtering

Instead of creating 1D-Histograms with only a luminance dimension, we also can create histograms that are three-dimensional, such as <L*a*b> instead of just luminance.

Figure 6:
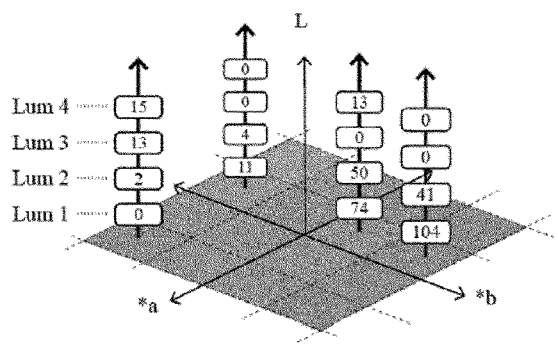
FIG. 6 is an example of a three-dimensional histogram.

FIG. 6 shows such a three-dimensional histogram, where pixel counts are not mapped solely against their luminance, but against Luminance and two chrominances. Convolution needs to take place in three directions, which doesn't introduce any additional magnitudes of processing power, since the Gaussian filter is separable. However, due to memory efficiency we suggest to limit the dimensions of a 3D histogram to 6-12 entries for the color directions and to 20-100 entries for each luminance. Then, to avoid artifacting, during readout of the histogram a bilinear interpolation in three directions is suggested.

Most equations in this document will work with three-dimensional histograms accordingly. Note that in a multiplication like Id·h( ) each entry of the histogram will need to be multiplied with the pixel's luminosity, disregarding chrominances.

Replacing 1D histograms with 3D histograms has many benefits. Basically, TTF like $f_{EPS}()$ or equations 13, 9 and 10, are capable of putting a "'focus'" on a certain band of luminosity. In the example of $f_{EPS}$, an average value for each band of luminosity is found (the band being defined by the 1D gauss filter). This can be refined by using a 3D histogram. Then the operations work on a local neighborhood as well as on a confined color space, being confined by luminance and chrominance.

One of the benefits thereof is that the TTF will be able to perform a filtering operation specific to one color, region and luminosity, while ignoring other colors in the same region and of the same luminosity. For instance, if equation 13 is implemented with a 3D histogram, the local, bilateral equalization can be performed individually for the blue sky and individually for the green meadow, even if both have the same luminosity. Or with respect to entropy finding, if a 3D histogram is used, the presence of same-luminosity but differently colored objects will not affect the detection of the entropy of a given object.

3.2 Plateau Sensitive LSC Filtering

If it is known that the image is blurry, then—let's say—a hair will consist of a dark center and a gray, blurry margin. This margin is not a wanted image area, as it is not representative for image contents, it's only representative for the image's blurriness. Therefore we suggest that the histograms be weighted with $$K_{x,y} = \log\left(\frac{1}{|\nabla(I_{xy})|}\right) \qquad (26)$$

where kappa is a measure for the likelihood that an image pixel's color is representative of an image feature opposed to a blurry edge between two features.

3.3 Gradient Constrained Post Filtering

The idea of gradient constrained post filtering is based on the observation that functions such as $f_{EPS}$ or in equation 11 can have sections where $f'(x) < \epsilon$ including even $f'(x) < 0$. In those cases image structures may get lost or turned into negative. This may lead to a loss of structure at local areas within the image, these areas rarely exceeding a few percent of the total image area.

This can be fixed by identifying above described areas and ensuring that the resulting image J has at least a n-level-step gradient, while n is the original image's gradient constrained to the bounds of [−4 . . . 4], for instance. Since this is a weak condition, this refinement does not require but high-frequency adjustments in the image, it is typically very local, and therefore the gradients can be fixed by ensuring this condition to be true first line-wise, then column-wise.

In other words, what's needed is an algorithm that processes the image line by line and determines if unwanted flat structures have occurred, and if so, forces the pixel differences to be at least the one of the original image, or at least 4 levels of luminosity change in the same direction, whichever is lower, and repeat the same for every column.

Another solution is to process the TTFs value by value and, while processing each TTF, ensuring that the derivative of the TTF is within an interval of [a, b], such as [0.25, 4]. This proves to be a helpful method to avoid extreme or negative contrasts. As the results may be (unwantedly) different depending on whether the TTF is passed from left-to-right or from right-to-left, it is preferable to compute the result in both directions and interpolate in between the two results. Typically, all TTFs of an image have much fewer entries than the image has pixels, so processing resources are not an issue.

4 Comparison of LSC Filter Domain to Other Image Domains

We use the language LSC Filter Domain to describe the class of the filters found herein. Unlike filters being applied to images' Fourier components (Frequency Domain), wavelet components (Wavelet Domain) or gradients (Gradient Domain), the filters provided in this disclosure are not being applied to the image in a different, bijective representation of itself. Therefore the conventional model of (1) transforming the image into a complete, different representation of the original image, (2) applying filters to the coefficients of the new representation, and (3) converting the image back does not hold true for the LSC filter domain. However, we still decided to name the concept provided in this disclosure a "filter domain," since the suggested technique allows us to:

express filters based on a different domain (a 1D field of accumulated pixel values versus a 2D field of frequencies, gradients or signal intensities)

find short expressions for filters that would be complicated, in-comprehensive in signal domain use a new mind-set for filters that facilitates the creation of new filters. (For instance, the filter provided in equation 24 would be very difficult to come up with in the spatial image domain).

Therefore, we name the concept found herein a filterdomain, while this does not mean that it is based on a complete image transform.

Often times, a parallel expression for a filter in signal domain can be found for expressions in the LSC filter domain. The following LSC filter domain TTF:

$$f = \frac{(h \cdot Id) \circ \text{gauss}}{h \circ \text{gauss}} \qquad (27)$$

which is identical to equation 4 would need to be expressed in spatial domain as:

$$I'_{x',y'} = \sum_{x,y} I_{x,y} g(\|(x, y) - (x', y')\|) g(\|I(x, y) - I(x', y')\|). \qquad (28)$$

Figure 7:
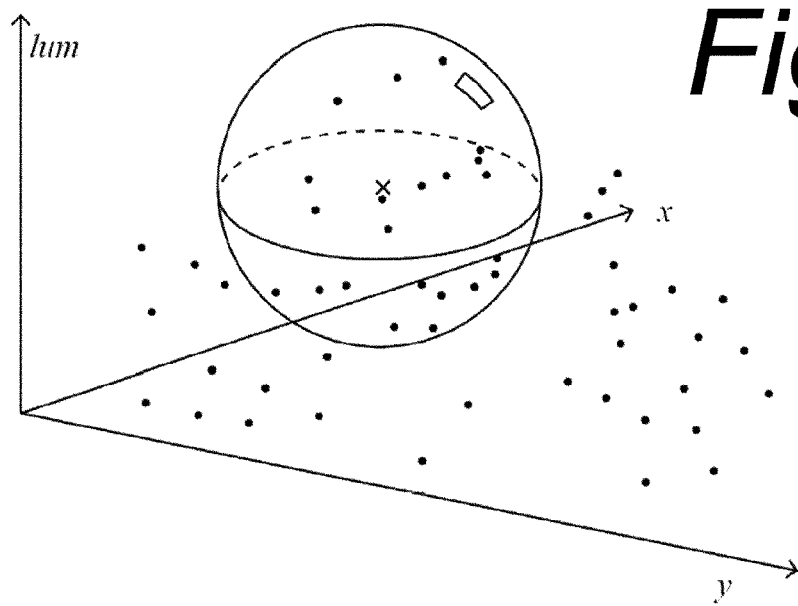
FIG. 7 illustrates how equation 30 can be imagined within the signal domain.

Also, the LSC domain filter TTF:

$$f = \frac{h \circ \text{leftgauss}}{h \circ \text{gauss}} \cdot 256 \qquad (29)$$

which is a simplified version of equation 13, is similar to the following expression in spatial domain:

$$I'_{x,y} = \frac{\sum_{x', y' \forall I(x', y') \leq I(x,y)} I(x, y) g(\|(x, y) - (x', y')\|) g(\|I(x, y) - I(x', y')\|)}{\sum_{x', y'} I(x, y) g(\|(x, y) - (x', y')\|) g(\|I(x, y) - I(x', y')\|)} \qquad (30)$$

with g( ) being a Gaussian bell function. As it is easy to see, the expressions in spatial domain (eq. 28, eq. 30) are not only less convenient to discuss and to comprehend than the expressions in LSC filter domain (eq. 27, eq. 29), they are also very processing intense to compute in spatial domain. FIG. 7 illustrates how equation 30 can be imagined within the signal domain: The average luminosity of the lower half of the depicted sphere is divided by the average luminosity of all pixels within the sphere. Here, the pixels are to be understood as a "particle cloud," where a position of a pixel is defined by its spatial coordinates and its luminosity.

All features disclosed in the specification, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

This invention is not limited to particular hardware described herein, and any hardware presently existing or developed in the future that permits processing of digital images using the method disclosed can be used, including for example, a digital camera system, or a phone enabled cellular telephone.

A program storage device readable by a machine is provided, tangibly embodying a program of instructions executable by the machine to perform the steps described herein. This could be, for example, a computer readable medium.

The term memory block refers to any possible computer-related image storage structure known to those skilled in the art, including but not limited to RAM, processor cache, hard drive, or combinations of those, including dynamic memory structures. Prefer-ably, the methods and application program interface disclosed will be embodied in a program of instructions (not shown) either by coding in a high level language.

Any currently existing or future developed program storage device suitable for reading by a machine can be used to store the programs embodying the afore-described interface, methods and algorithms, including, but not limited to hard drives, floppy disks, digital tape, flash cards, compact discs, and DVD's. The program storage device can comprise more than one device, such as two linked hard drives. This invention is not limited to the particular hardware used herein, and any hardware currently existing or developed in the future that permits image processing can be used.

As used herein, the terms tile histogram and regional histogram, tile transfer function and regional histogram function, and interpolated tile transfer function and image transfer function, are, respectively, synonyms.

Also, any element in a claim that does not explicitly state "means for" performing a specified function or "step for" performing a specified function, should not be interpreted as a "means" or "step" clause as specified in 35 U.S.C. §112.

I claim:

1. A method for filtering a digital image comprising a first plurality of pixels, the method comprising:
    segmenting the first plurality of pixels into a first plurality of regions;
    computing a first plurality of regional histograms by calculating a regional histogram corresponding to each region in the first plurality of regions;
    computing a first plurality of regional transfer functions by calculating for each region in the first plurality of regions a regional transfer function comprising a convolution of the corresponding regional histogram with a first convolution kernel;
    deriving an image transfer function by interpolation of two or more of the first plurality of regional transfer functions; and
    filtering the digital image by applying the image transfer function to each of the first plurality of pixels.

2. The method of claim 1, where the first plurality of pixels comprises the entire digital image.

3. The method of claim 2, where the regions are non-overlapping, and each pixel of the first plurality of pixels is contained within a region.

4. The method of claim 1, where the interpolation of the regional transfer functions comprises:
    selecting a pixel having a luminosity value from a first region of the first plurality of regions;
    computing a plurality of single value results by inputting the selected pixel's luminosity value into each of a second plurality of regional transfer functions, said second plurality including regional transfer functions corresponding to regions not comprising the selected pixel; and
    interpolating a resulting value for the selected pixel as a function of the plurality of single value results.

5. The method of claim 1, where the first convolution kernel is a Gaussian function.

6. The method of claim 1, where the first convolution kernel is one-dimensional.

7. The method of claim 1, where the regional transfer function is also a function of a second convolution comprising the convolution of the corresponding regional histogram with a second convolution kernel.

8. The method of claim 7, where the first convolution kernel is a Gaussian function, and the second convolution kernel is a product of a Gaussian function and a step function.

9. The method of claim 7, where the second convolution is weighted by pixel luminosity.

10. The method of claim 1, where the plurality of regional histograms are a function of luminosity, of pixel difference, of color, of depth along a z-axis, or of saturation.

11. A method for filtering a digital image comprising a first plurality of pixels, each pixel having a luminosity value and being within a neighborhood comprising a second plurality of pixels, the neighborhood having an extent, the method comprising:
- selecting, using one or more processors programmed to perform the method, a pixel from the first plurality of pixels;
- calculating, using the one or more processors, a new luminosity value for the selected pixel as a function of the ratio of the number of pixels in the neighborhood that fulfill a given condition to the total number of pixels in the neighborhood, the condition comprising a luminance comparison against said pixel;
- storing, using the one or more processors, the new luminosity value for the selected pixel; and
- repeating the calculating step and the storing step until a new luminosity value for each of the first plurality of pixels has been calculated.

12. The method of claims 11, where the first plurality of pixels comprises the entire digital image.

13. The method of claims 11, where the extent of the neighborhood is defined by a distance function.

14. The method of claim 13, where the distance function comprises one or more of a spatial distance, a vector difference, or a colormetrical distance.

15. The method of claim 13, where said pixel numbers in the ratio are weighted, pixels with a low distance to the selected pixel receiving a high weight and pixels with a high distance to the selected pixel receiving a low weight.

16. A program storage device readable by a machine, tangibly embodying a program of instructions executable by the machine to perform method steps to transform a digital image comprising a first plurality of pixels, said method steps comprising:
- segmenting the first plurality of pixels into a first plurality of regions;
- computing a first plurality of regional histograms by calculating a regional histogram corresponding to each region in the first plurality of regions;
- computing a first plurality of regional transfer functions by calculating for each region in the first plurality of regions a regional transfer function comprising a convolution of the corresponding regional histogram with a first convolution kernel;
- deriving an image transfer function by interpolation of two or more of the first plurality of regional transfer functions; and
- filtering the digital image by applying the image transfer function to each of the first plurality of pixels.

17. A method for filtering a digital image comprising steps for:
- segmenting the digital image into a plurality of tiles;
- computing tile histograms corresponding to each of the plurality of tiles;
- deriving a plurality of tile transfer functions from the tile histograms;
- interpolating a tile transfer function from the plurality of tile transfer functions; and
- filtering the digital image with the interpolated tile transfer function.

* * * * *